July 17, 1962     J. P. DOLAN ETAL     3,045,198
DETECTION DEVICE
Filed Dec. 11, 1959     2 Sheets-Sheet 1
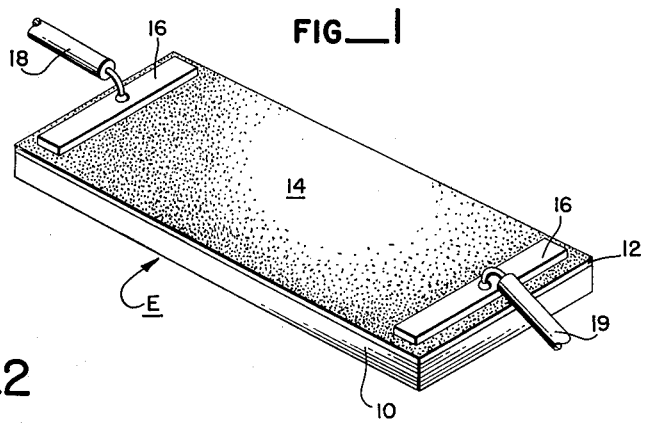
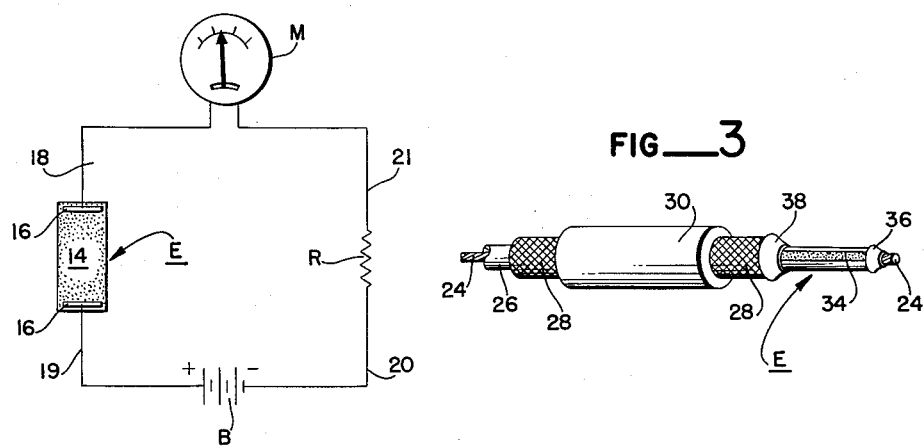
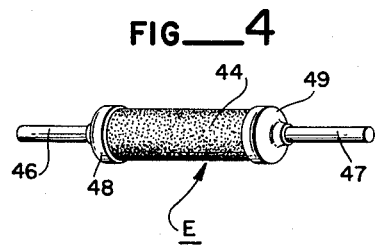
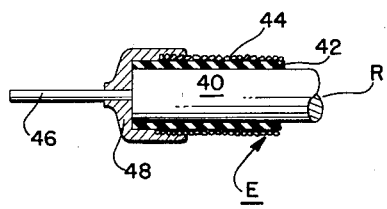
JAMES P. DOLAN
WILLIAM M. JORDAN
INVENTORS
BY Smith & Tuck

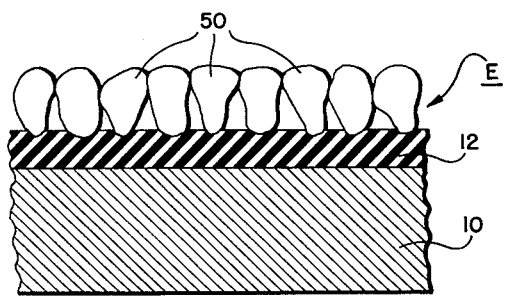
FIG.—6
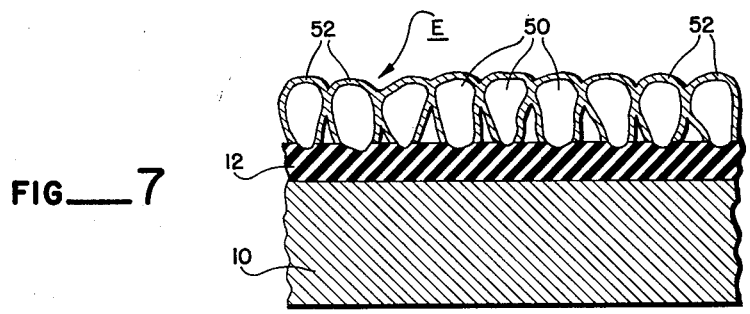
FIG.—7
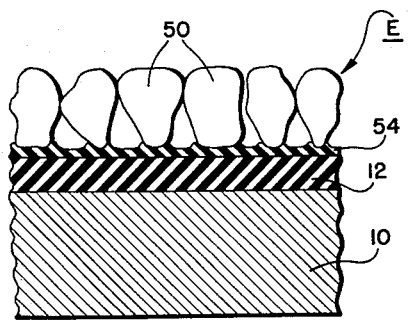
FIG.—8
JAMES P. DOLAN
WILLIAM M. JORDAN
INVENTORS
BY Smith & Tuck United States Patent Office 3,045,198
Patented July 17, 1962

3,045,198
DETECTION DEVICE
James P. Dolan and William M. Jordan, both of
8214 42nd Ave. NE., Seattle, Wash.
Filed Dec. 11, 1959, Ser. No. 859,005
13 Claims. (Cl. 338—13)

This invention relates to a detection device and, more particularly, to an electrical element sensitive to exposure to liquids, vapors or gases, to signal the presence of such in the environment of the element.

There has long existed a need for a detection element of simple construction and operable at low levels of current flow yet capable of detecting the presence in an atmosphere of liquids, vapors or gases. For example, in vehicles of all kinds including boats, land vehicles, aircraft, the detection and signalling of the presence of liquids, vapors or gases in enclosed atmospheres in a variable range of concentrations is very desirable because such can evidence the existence of a dangerous condition. Also, the measurement of concentrations of liquids, vapors or gases by use of a simple device in an inexpensive manner is well known to be desirable.

Essentially, this invention involves the establishment of an electrical path of known characteristics under normal conditions and arranging that the electrical resistance of the path increases upon the exposure of the electrical path to an increase, in the normal atmosphere, of liquids, vapors or gases to which said element is sensitive. Reciprocally, the element returns to a normal condition of the electrical path upon the decrease in or dissipation from the particles of adsorbed portions of such liquids, vapors or gases to which the element is adsorbently sensitive.

A simple form of adsorbating element comprises a plurality of electrically conductive particles, adsorbently sensitive to liquids, vapors or gases, with the particles arranged in sequential contact to form one or more electrically conductive paths between separated points. The particles are independently anchored on a resilient surface associated with a base that is relatively non-resilient. In accordance with known principles, portions of the liquids, vapors or gases to which the particles are sensitive are adsorbed upon and between the particles when exposure occurs. The adsorbate, interposed between the resiliently anchored contacting particles, separates the particles and alters the conductivity of the electrical path in that its resistance to current flow increases. Upon the dissipation or departure of the adsorbate from the particles, due to the resilience of the surface to which they are anchored, they return to normal conductive contact and current flow increases can be measured.

A principal object of this invention is the provision of a simple electrical apparatus having utility for signalling liquid, vapor or gas changes in an environment such as an atmosphere normally surrounding the apparatus. Another object has been to provide, as a new article of manufacture, a sensitive element including an electrical path formed of discrete conductive particles the conductance and resistance of which is related to the exposure or non-exposure of the element to liquids, vapors or gases in the surrounding environment. It will be apparent to those skilled in the art that the accompanying disclosure and the following description and discussion sets forth further and other objects of this invention.

One preferred form of detection element embodying the invention includes a relatively broad and long base having an electrically non-conductive, relatively resilient surface on which there is anchored a stratum of exposed electrically conductive discrete adsorbent particles. The particles are anchored in such fashion that under normal conditions adjacent particles are in conductive contact whereby at least one but usually many electrical paths extend across the stratum between spaced apart points. Electrical leads are in contact with a broad portion of the stratum at such separated points. The article, upon being exposed to substances to which the stratum is sensitive will signal changes in its characteristics by increases in resistance or decreases in conductance with regard to the flow of electrical current through said path or paths. The resilient surface is electrically non-conductive and is desirably formed of natural or synthetic rubber, or mixtures thereof, or of vinyl or polyethylene substances. The base may be rigid, metal or non-metallic sheet or bar or rod stock to which is attached, as an exposed surface, the electrically non-conductive relatively resilient surface. Alternatively the base may be composed solely of the same material that forms the resilient surface so long as the mass of the base is sufficiently great relative to the surface that the body, as a whole, is either substantially non-resilient in the sense used here or has such a low order of resilience relative to the exposed resilient surface to which the particles are anchored as to be practically rigid.

The stratum of electrically conductive discrete adsorbent particles may be anchored independently of each other by the use of adhesive means interposed between the resilient surface and each particle. Or the particles may be anchored to the resilient surface by being independently partially embedded therein under the effect of pressure, or by the use of heat, or by both pressure and heat. It is desirable that the particles not be anchored to each other except in the resilient or separable manner permitted by the material forming the resilient surface or platform.

The adsorbent particles which may vary in size from that of one micron or smaller to as much as 0.05 inch or more, may be regular or irregular in shape, depending upon the nature of the electrically conductive material from which they are formed. Suitable particles may be selected from the group consisting of platinum, platinum black, aluminum, silver, gold, tantalum, carbon or any other of the well known electrically conductive particles. In some instances the particles may all be of carbon and in other cases all of metallic origin either singly or in mixture. On occasion mixtures of various electrically conductive particles may be satisfactorily used where it is desirable that the electrical element, including such particles, be designed to be sensitive to, for example, several different gases, vapors or liquids.

In the accompanying drawings various forms of detector elements are disclosed, either in actual physical form or diagrammatically. It will be understood by those skilled in the art that these showings are illustrative only for the purposes of disclosing the invention, and that the actual physical forms may be altered as to shape or size or as to the components therein to meet the requirements of various uses to which the invention may be put, all without departing from the intended scope of this invention. Such alterations and variations in design as are the reasonable equivalent of the structure and combinations shown illustrating this invention and described in this written disclosure are deemed to be within the spirit and scope of this invention as more fully defined in the subjoined claims.

Throughout this disclosure the word "adsorbent" is used and it is intended that in such use it shall mean a substance having the ability of condensing or holding other substances (i.e. liquids, vapors and gases) on its surface. An "adsorbate" is the condensed or held portion of the substance on the particle. The act of a particle taking up a liquid, vapor or gas on its surface is "adsorption." "Adsorbate" and "adsorbent" are here treated as synonyms.

In the drawings:

FIGURE 1 is a perspective view somewhat schematically illustrating the essential features of a simple embodiment of this invention;

FIGURE 2 is a schematic diagram showing the incorporation of a detection device into an electric circuit;

FIGURE 3 shows a multi-conductor cable having a detection device incorporated therein;

FIGURE 4 illustrates the embodiment of a detector device into a cylindrical body;

FIGURE 5 is an enlarged detail of one end of the device of FIGURE 4 with portions broken away for convenience of illustration;

FIGURES 6 and 7 are enlarged fragmentary cross section views of a portion of the detection element illustrating the adsorption phenomenon; and FIGURE 8 illustrates the adhesive anchoring of the sensitive particles.

With reference to FIGURE 1 the sensing element E will be seen to comprise a rigid base 10 having a resilient surface 12 on the exposed face of which is particle stratum 14 of discrete adsorbent metallic particles. Electrically conductive terminals or leads 16, 16 are in contact with the stratum 14 at separated points thereof. It will be understood that conductors 18 and 19 extend oppositely from terminals 16. Means is thereby provided for incorporating the element E into an electric circuit, as shown in FIGURE 2. The circuit comprises meter M, battery B, current limiting resistor R, and element E. Conductor 18 in this instance connects with meter M and conductor 19 is attached to the battery B from the opposite pole of which conductor 20 extends to resistor R, the latter being in turn connected by conductor 21 to the other side of meter M. When the particles of stratum 14 are exposed to a gas, for example, to which they are adsorbently sensitive, current flow will be reduced due to increased resistance and this will be evidenced on the meter M by needle movement. It will be understood that such a change in conductance may be employed to operate other forms of signal devices as desired.

Base 10 must have a degree of rigidity sufficient that it does not materially change in dimension upon the elongation, enlargement or distortion of resilient surface 12. The base 10 may be formed of such materials as glass, ceramics, porcelains, polymerized synthetic resinous materials, metal sheets, bars or plates, or the like. In those embodiments of the invention in which the base 10 is rigid and the resilient surface 12 as a separate element is secured thereto, the latter is electrically non-conductive but the base 10 may be electrically conductive so long as it does not affect the operation of the sensitive element.

The resilient member 12 may be formed from such materials as sheet vinyl or polyethylene substances, or from natural or synthetic rubber, or mixtures thereof, or from such materials as are known as "neoprene," "Viton," and the like. The important consideration with respect to the member 12 is that it have a resilience which is relatively greater than that of the base 10 and such as to permit separation of the particles mounted thereon when adsorption occurs.

Base 10 may be of the same material as the material forming the resilient layer or element 12 if its mass is relatively great enough that it will not elongate or distort or enlarge when the detection element is exposed to liquids, vapors or gases, to which it is sensitive. Under such circumstances the resilient surface will, of course, be enlarged, distorted or elongated when adsorption of a substance on the surfaces of the particles occurs.

In FIGURE 3 the sensing element E comprises a stranded cable 24, encased in resilient sleeve 26 which is surrounded by woven-strand shielding 28, the latter in turn covered by insulative sleeve 30. The sensing element E is formed integrally at the end of a cable, portions of which (to the left in FIGURE 3) are broken away for convenience of illustration. Particle stratum 34 is anchored on the outer surface of an exposed portion of resilient sleeve 26 to thereby flexibly mount the particles for independent movement relative each other. At one end of the stratum 34 a terminal connector 36 is formed between the stratum and the stranded cable conductor 24. The opposite end of the stratum has a similar terminal connector 38 conductively joining the stratum 34 to shielding 28. The connections 36 and 38 are formed practically by the use of a substance known as silver print, the same being a fluid comprising metallic particles in a volatile vehicle and which may be applied much in the manner of paint. When the collar shaped connectors 36, 38 are formed, as by painting techniques, and the vehicle has evaporated or set, the particles of the silver print coalesce and form a metallic conductive path between the stratum and the respective conductive elements 24 and 28. This arrangement incorporates the stratum 34 in circuit between conduits 24 and 28 and it may, in turn, be incorporated into another circuit with other electrical power and signal means of the nature shown in FIGURE 2.

FIGURES 4 and 5 alternatively show a form of sensing element E cylindrical in shape. The non-conductive cylindrical body 40 is provided with external resilient sleeve 40 to which is applied the stratum 44 of metallic particles. In this case the stratum of particles completely encloses sleeve 42 circumferentially and substantially from end to end. Body 40 has conductors 46, 47 extending from opposite ends and conductive connections 48, 49 are provided between the particle stratum 44 and the respective conductors or leads to incorporate the former in a circuit extending between conductors 46, 47. As described above, connectors 48, 49 may be formed of silver print or they may comprise a formed metallic cap electro-conductively associated between the conductors 46 or 47 and the stratum 44.

Other forms and shapes of element E will be readily visualized without difficulty by those skilled in the art in accordance with the details of the disclosures herein.

The phenomena of adsorption involved in element E is illustrated in FIGURES 6 and 7 where, in enlarged detail, is shown a sensing element in fragmentary cross section. The element includes base 10, resilient layer 12, and a number of particles 50 each independently anchored to the resilient surface 12 with adjacent particles in electro-conductive contact. The conductive contact between and throughout the plurality of particles forms an electrical path from one end of a group to the other. FIGURE 6 shows the normal condition of the sensing element and FIGURE 7 shows the condition of the element upon the occurrence of surface adsorption of a substance.

Adsorption is believed to comprise the accumulation of a mono-molecular layer of the adsorbed substance, the adsorbate layer 52 is indicated in FIGURE 7 as encasing solidly and cohering to the surface of the particles 50. It will be noted that the adsorbate interposes itself between the particles that are normally in contact and separates them. The force involved to separate the particles is generally and well-known as Van der Waal's adsorption forces.

Upon the occurrence of adsorption on and between the particles for normal conductance of the electrical path is impaired or reduced with reciprocal increases in resistance to current flow. This increase may be sensed by an ohmmeter or it may activate new resistance sensitive electrical elements and through them employing elements for signalling purposes.

The increase in resistance in the case of exposure of element E to very low concentrations of gases, vapors or liquids in the surrounding atmosphere will generally require time for there to occur sufficient adsorption to be sensed or detected, although given sufficient time very low concentrations will be noticeably sensed.

With higher concentrations, for example of a gas such as carbon tetrachloride in gaseous form, the rate of adsorption will necessarily be relatively greater than with low concentrations, with a consequent more rapid increase in resistance and a more rapid indication of the presence of such gases being sensed.

Upon the removal of materials or substances to which the element is sensitive from atmosphere surrounding the element, the adsorbate will be dissipated or withdrawn from the surfaces of the particles and the element will return to the normal condition due to the effect of the resilient layer on which the particles are anchored. That is, the particles will spring back into normal conductive contact and thus will be re-established the normal conductance of the electric path or paths throughout the stratum of particles. The disssipation of the adsorbate may be accelerated after adsorption has occurred in an element E by increasing the voltage across the element briefly or momentarily.

It is preferable in the employment of an element E in circuitry such as shown in FIGURE 2 to operate the same at voltages below the ionization point of the gases, vapors or liquids to which the element is sensitive, as otherwise adsorption would be precluded in the event that ionization on the surface particle stratum should occur.

The anchoring of the particles 50 to a resilient surface 12 may be accomplished in several ways. In FIGURE 8 the anchoring is shown to have been accomplished by embedding portions of the particles, independently of each other, into the outer surface of resilient layer 12. In the case of those resilient materials which are heat sensitive the layer 12 may be exposed to radiant or other heat sources until the surface becomes deformable and, in certain instances, tacky. The stratum of particles 50 is thereupon presented to the surface and pressed into the same sufficiently to obtain the desired flexible anchoring effect. In those cases where the resilient layer 12 is pressure sensitive or partially dissolved and will deform upon the application of the particles under pressure and then grip the particles, the embedding action may be performed at relatively low temperatures.

Alternatively, the particles 10 may be adhesively attached to the resilient layer 12. This is shown in FIGURE 8, in which an adhesive substance 54, compatible with layer 12, is applied thereto and fused thereon. The adhesive thus forms sockets or pockets that receive the particles 50 and hold them in the desired resilient manner. For example, the adhesive film 54 on layer 12 where the latter comprises rubber would in turn be formed of a rubber compound which contains a solvent that evaporates and leaves a deposit of the adhesive component adhering both to the layer 12 and the particle 50.

When the stratum 14 is formed of relatively small conductive particles 50 the sensing element E will generally operate at higher resistance ranges than when the particles are somewhat larger whereupon resistance will be lower. It is possible to form combinations of large and small conductive particles to design sensitive strata having different characteristics with respect to the conductance-resistance of the element. Sensitivity and responsiveness of the element E likewise may be varied by variations in the resilience of the surface to which the particles are independently anchored. Thus an extremely sensitive element may be produced with a highly resilient particle-supporting layer 12, whereas with a layer 12 of relatively low resilience, using the same type of particles, the sensitivity of the element will be reduced.

*Example*

As a specific example an element E was produced by embedding and anchoring silver particles on a polyethylene film. The polyethylene film had a thickness of 1 mil and was paper backed, the backing being a 70 lb. kraft paper. The silver particles are known in the dental amalgam field as "Silver Crown," non-zinc, five-cut alloy and are the product of General Refineries, Inc. These particles are over 90% pure silver, have substantially uniform size of 0.001" mean diameter, and are grindings of irregular shape. These particles are substantially non-corrosive at normal temperatures when exposed to most gases.

A thin, even bed of silver particles was deposited on a rigid heated metal surface the temperature of which was approximately 400° F. A ⅜" wide strip about 3" long of the paper-backed polyethylene was superposed on to the heated particles with the polyethylene surface directly contacting the particles. The strip was forced against the particles with pressure in excess of that required to anchor the silver to the then tacky surface of the polyethylene. The strip was immediately thereafter removed from the heated surface and cooled whereupon the anchoring of the particles in a resilient surface was completed.

From the metal particle-surfaced polyethylene strip, an element E as typically shown in FIGURE 1 was fabricated. This element was ⅜" wide across the stratum of particles and ½" between the spaced apart conductors 16, 16. The stratum, its resilient base, and the paper backing was then adhesively mounted on a Bakelite sheet with the latter and the paper backing juxtaposed. The Bakelite sheet comprised the nonresilient base 10 of the element.

A series of tests of the conductance-resistance characteristics of the element was thereafter made with the element incorporated into a circuit as in FIGURE 2. The element was then subjected to atmospheres saturated with various gases and the following results were obtained.

| Substance | Total resistance change on saturation measured in ohms | Van der Waal's "a"-constants for gases |
|---|---|---|
| Air (Nitrogen) | 95.0 | 0.001747 |
| Ethyl alcohol | 900.0 | 0.003758 |
| Acetone | 1,000.0 | 0.004437 |
| Benzene | 1,000,000.0 | 0.005150 |
| Carbon tetrachloride | 5,000,000.0 | 0.006173 |

The above represents the behavior of an element as described above under actual test conditions with a group of selected gases.

It will be noted that the selection of a specific gas will result in a predeterminable resistance which is directly correlated to the "a" factor of Van der Waal's constants for gases. This "a" factor is a measurement of the attractive force between molecules of a gas. The correlation of resistance to the adsorptive force of molecules effects a resistance change in our invention in liquids in the same general manner as do dissimilar gases.

Having thus described the invention, what is claimed is:

1. An electrical element sensitive to exposure to liquids, vapors or gases, comprising: a base having an electrically non-conductive, non-absorbent, relatively resilient surface, a stratum of exposed, electrically conductive, discrete, adsorbent particles independently anchored on said resilient surface with conductive contact normally existing between adjacent particles substantially fully throughout said stratum, and electrical leads contacting said stratum at separated points; the density of said particles in said stratum being substantially uniform throughout said stratum.

2. An element according to claim 1 in which the resilient surface is formed of material selected from the group consisting of natural rubber, synthetic rubber, mixtures of natural and synthetic rubbers, vinyl and polyethylene substances.

3. An element in accordance with claim 1 in which the adsorbent particles are of metallic origin.

4. An element in accordance with claim 1 in which the particles are carbon.

5. An element in accordance with claim 1 in which said particles are adhesively anchored to said resilient surface.

6. An element in accordance with claim 1 in which said particles are anchored to said resilient surface by being partially embedded therein.

7. An element according to claim 1 wherein said particles in the major dimension are of a size in the range between about 1 micron or smaller and approximately 0.05 inch.

8. An electrical element sensitive to exposure to liquids, vapors or gases, comprising: means forming a base having an electrically non-conductive, non-adsorbent, relatively resilient surface, a stratum of exposed, electrically conductive, discrete, adsorbent particles independently anchored on said resilient surface with conductive contact normally existing between adjacent particles substantially fully throughout said stratum, the resilience of said resilient surface being such that adjacent particles may separate upon the adsorption of a liquid, vapor or gas, between normally contacting particles and will return to normal conductive contact upon the departure of adsorbed liquid, vapor or gas, from between said particle surfaces, and electrical leads contacting said stratum at points separated by a portion of said stratum.

9. An electrical element sensitive to exposure to liquids vapors or gases, comprising: a base having a non-conductive, non-adsorbent, relatively resilient surface separating a pair of electrical leads, and an electrically conductive path in contact with and extending between said leads, said path being formed of a plurality of electrically conductive, discrete particles adsorbently sensitive to the presence of liquids, vapors or gases in the surrounding atmosphere; said particles being independently anchored in exposed condition on said resilient surface with conductive contact normally existing between adjacent particles.

10. An electrical element, comprising: a base having a non-conductive, relatively resilient surface separating a pair of electrical leads, and an electrical path extending between said leads, said path being formed of electrically conductive exposed particles adsorbently sensitive to the presence of gases, liquids or vapors in the surrounding atmosphere, said particles being independently anchored on said resilient surface with conductive contact normally existing between adjacent particles forming said path.

11. A detection element, comprising: a member including a resilient surface distortable relative thereto; a plurality of adsorbently sensitive particles independently anchored to said surface, with electro-conductive contact between adjacent particles; and electro-conductive means in contact with said plurality of particles at spaced apart points.

12. An electrical variable resistance device, comprising: means forming a resilient base having spaced apart conductive electrodes thereon; a substantially single-particle stratum of fluid adsorbent particles secured to said base with interfacial contact between adjacent particles, said stratum forming a resistance path between said electrodes variable in relation to adsorbate interposed between contacting particles upon exposure to fluid, said base being of material expandible under the influence of said adsorbate interposition but relatively non-expandible under the influence of moisture, vapor or gases.

13. The device of claim 12, in which the base is polyethylene.

References Cited in the file of this patent
UNITED STATES PATENTS

| | | |
|---|---|---|
| 2,408,093 | Patterson | Sept. 24, 1946 |
| 2,471,601 | Albright | May 31, 1949 |
| 2,589,983 | Blodgett | Mar. 18, 1952 |
| 2,701,832 | Marsden et al. | Feb. 8, 1955 |
| 2,713,625 | Johnson et al. | July 19, 1955 |